United States Patent
Hansen et al.

[11] Patent Number: 6,155,283
[45] Date of Patent: Dec. 5, 2000

[54] INTELLIGENT VALVE POSITIONER TUNING

[75] Inventors: Peter Daniel Hansen, Wellesley; Bulent Goksel, Quincy, both of Mass.

[73] Assignee: The Foxboro Company, Foxboro, Mass.

[21] Appl. No.: 09/393,151

[22] Filed: Sep. 10, 1999

[51] Int. Cl.[7] .................................................. F16K 37/00
[52] U.S. Cl. ..................................... 137/1; 137/551; 73/9
[58] Field of Search ..................................... 137/551, 553, 137/1; 73/9

[56] References Cited

U.S. PATENT DOCUMENTS

| | | |
|---|---|---|
| 4,029,122 | 6/1977 | Jaegtnes ........................................ 73/9 X |
| 4,274,438 | 6/1981 | La Coste ..................................... 137/551 |
| 5,043,863 | 8/1991 | Bristol et al. . |
| 5,329,465 | 7/1994 | Arcella et al. . |
| 5,394,322 | 2/1995 | Hansen . |
| 5,406,474 | 4/1995 | Hansen . |
| 5,538,036 | 7/1996 | Bergamini et al. ................. 137/551 X |
| 5,541,833 | 7/1996 | Bristol et al. . |
| 5,566,065 | 10/1996 | Hansen et al. . |
| 5,570,282 | 10/1996 | Hansen et al. . |
| 5,587,896 | 12/1996 | Hansen et al. . |
| 5,704,011 | 12/1997 | Hansen et al. . |

*Primary Examiner*—Kevin Lee
*Attorney, Agent, or Firm*—Fish & Richardson P.C.

[57] ABSTRACT

A valve position controller tuning method avoids impact of friction in valve positioner tuning by building a dynamic model of a valve positioner from a monotonic open-loop response of a valve stem position to a change in valve position controller output. To this end, a model form is selected based on the type of pneumatic actuator and relay that controls valve flow modulating of member motion, and the valve position controller is operated in an open-loop mode. The method includes changing a valve position controller output signal to cause the valve positioner to move a valve flow modulating member, connected to valve positioner, monotonically from one stuck position to another stuck position immediately after a motion in that same direction. When a valve stem position reaches a position threshold, a first valve stem position change and a corresponding time change are measured. The method includes measuring valve stem position changes at times that depend on the first measured time change. Using the measured results, valve positioner response parameters are calculated for the selected model form from which valve position controller tuning constants are calculated.

17 Claims, 7 Drawing Sheets

INTELLIGENT VALVE POSITIONER TUNING

TECHNICAL FIELD

This invention relates to intelligent valve positioner tuning.

BACKGROUND

A process controller typically operates by comparing values of a process variable with a target value to determine whether the process is operating within acceptable bounds. For example, in a process in which a water flow cools a power source, a controller monitors a temperature of the power source and, if necessary to prevent the power source from overheating, reduces the temperature of the water.

An adaptive controller is a controller that adjusts or adapts its parameters to suit the current process condition based on the behavior of the controller inputs and/or outputs. For adaptive control, a controller may identify a model of the process under control and generate new controller parameters from the identified process model. The process model may have a preselected number of parameters to identify. Process parameters may be determined by having the controller upset the process in an open-loop mode and measure the process response. One advantage of identifying a process model is that the model enables direct calculation of the controller tuning parameters, avoiding the need for a slowly converging performance feedback method.

A valve positioner system is a position controller that controls the position of a valve in response to a set point signal. For example, in a chemical mixing process, a valve positioner system may be used to regulate flow which would then change a concentration of a particular chemical in the mixing process. A chemical mixing process controller monitors the concentrations of all chemicals in the mix and provides set point signals to various valve positioners which vary the flow of the chemicals.

A valve positioner system controls position of the valve by comparing a measured position with a set point or target position and changing its output accordingly. The valve positioner system typically includes a current-to-pressure (i/p) transducer that receives a variable electrical input signal and provides a pneumatic output signal. The valve positioner system employs the i/p transducer in a feedback loop that includes a pneumatic relay, a valve actuator, a valve having a valve stem attached to a valve flow modulating member, a positioner feedback linkage, a position sensor, and a microprocessor.

The microprocessor receives the set point signal and produces the input signal for the i/p transducer. The valve actuator responds to the pressure change produced by the pneumatic relay by driving the valve stem to control the degree to which the valve is open. The positioner feedback linkage transmits the position of the valve stem to the position sensor, which provides a signal indicative of the position to the microprocessor. The microprocessor then adjusts the signal supplied to the i/p transducer so as to move the valve to the position indicated by the set point, or to maintain the position of the valve at the set point.

SUMMARY

A valve position controller tuning method accounts for friction in valve motion by building a dynamic model of position response of a valve stem attached to a valve flow modulating member and controlled by a valve positioner. To this end, a model form is selected and the valve position controller is operated in an open-loop mode. The method includes activating a valve position controller output signal that causes the valve stem to move monotonically from one stuck position to another stuck position immediately after a motion in that same direction. When a valve stem position exceeds a position threshold, a first valve stem position change and a corresponding valve stem position change time are measured. The method then includes measuring valve stem position changes at times that depend on the first measured valve stem position change time. Using the measured results, valve position response parameters are calculated for the selected model form.

Embodiments may include one or more of the following features. For example, the method may further include building an all-denominator transfer function model for the selected model form. The method may include operating the valve position controller in a closed-loop mode that processes the set point signal of valve stem position in conjunction with the valve position feedback signal. Building an all-denominator transfer function model for the selected model form may include expanding the model form into a denominator Taylor series that is a function of an algebraic operator representing differentiation.

The times that depend on the first measured valve stem position change time may correspond to integer multiples of the first measured valve stem position change time. Selecting the model form may be based on a type of valve actuator system used.

Activating the valve position controller output signal may include moving a valve stem of the valve in either of two possible movement directions.

Furthermore, activating the valve position controller output signal may include changing a current value of an input signal fed to a current-to-pressure (i/p) transducer that converts the input signal into a pneumatic signal proportional to the input signal. Changing the current value of the input signal may include using a step function. Alternately, changing the current value of the input signal may include using a pulse function or a doublet-pulse function.

Activating the valve position controller output signal may be based on a number of integrators characterizing the response of valve stem position to the i/p transducer input signal.

The selected model form may include an integral-delay model (that is, including one integrator). Likewise, the selected model form may include an integral-integral-delay model (that is, including two integrators). Furthermore, the selected model form may include a gain-lag-delay model (that is, including zero integrators).

The valve position controller may include a proportional-derivative controller that receives valve stem position information and a set point for valve stem position to determine a new i/p input signal. Similarly, the valve position controller may include a proportional-integral-derivative controller that receives valve stem position information and a set point valve stem position to determine a new i/p input signal.

Other features and advantages will be apparent from the following description, including the drawings, and from the claims.

DRAWING DESCRIPTIONS

DETAILED DESCRIPTION

Figure 1:
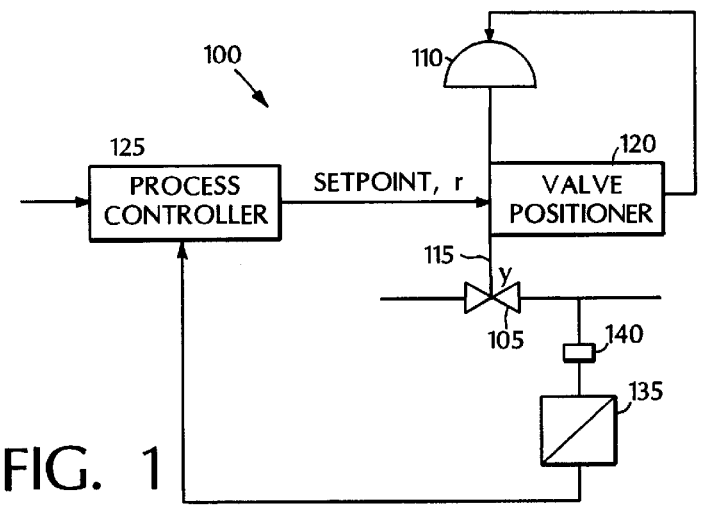
FIG. 1 is a block diagram of a valve positioner implemented within a process control loop.

Referring to FIG. 1, an adaptive valve positioner system 100 includes a valve flow modulating member 105 controlled by a piston or diaphragm type pneumatic actuator 110. Pressure supplied to the pneumatic actuator 110 or a return spring drives a valve stem 115 that controls a position y of the valve flow modulating member 105. A valve positioner 120 compares a valve stem position set point r, output by a process controller 125, to the actual valve stem position y, measured by a position sensor 130 (shown in FIG. 2) within the valve positioner 120, and adjusts a pressure $p_y$, in the pneumatic actuator 110 until the valve stem position y matches the set point r. Changes in the pressure $p_y$ produce corresponding changes in the position y of the valve stem 115. A feedback linkage is used to close the loop between the valve stem 115 and the valve positioner 120. A transmitter 135 provides process variable feedback (detected by a sensor 140) to the process controller 125.

Figure 2:
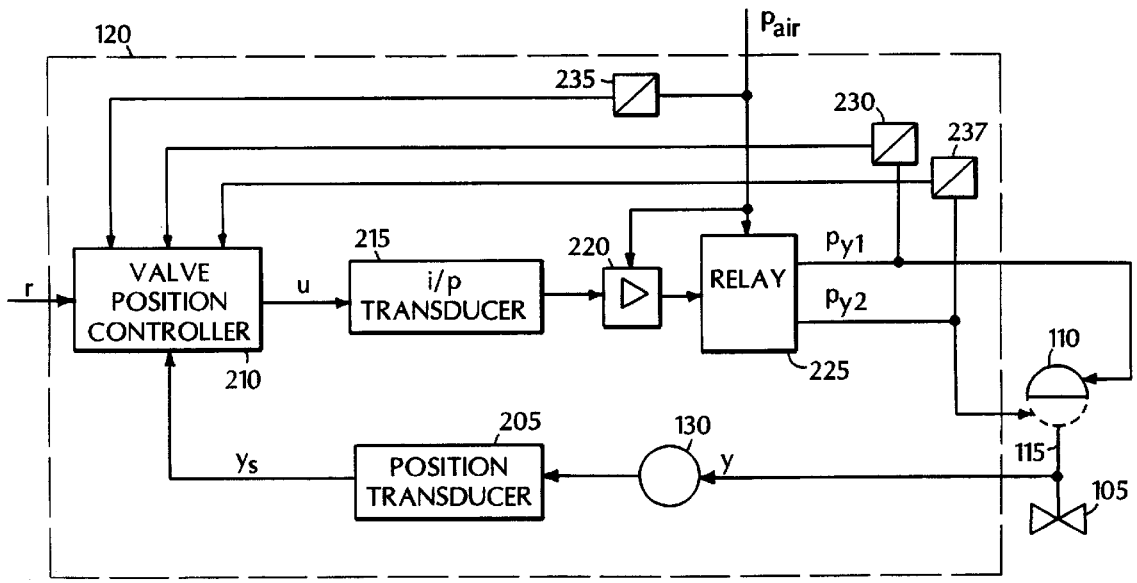
FIG. 2 is a block diagram of a valve positioner used in the process control loop of FIG. 1.

FIG. 2 provides a detailed block diagram of the valve positioner 120. A position transducer 205 receives feedback from a position sensor 130 coupled to valve stem 115 and produces a signal, $y_s$, indicative of the valve flow modulating member position. During normal operation, feedback enables the valve positioner 120 to adjust the valve flow modulating member position.

The set point r and the valve flow modulating member position signal $y_s$ are supplied to a valve position controller 210 which may be implemented in a microprocessor. During identification of the process model, the valve position controller 210 is operated in a manual mode causing the positioner 120 to run in open-loop mode. In many implementations, the set point signal takes the form of a digital signal that indicates a desired position for the valve flow modulating member 105. The set point signal also may be an analog signal indicative of a desired valve member position.

When the valve position controller 210 is in an automatic mode that causes the valve positioner 120 to run in closed-loop mode, the valve position controller 210 produces a control signal u that is dependent on the set point r and the position signal $y_s$. A current-to-pressure (i/p) transducer 215 converts the valve position controller output signal u into a pneumatic signal. The i/p transducer 215 is used in conjunction with a pneumatic preamplifier 220 which provides immunity to fluctuations in the pressure $p_{air}$ of supply air. Output of the preamplifier 220 is fed to a pneumatic relay 225 which may increase the magnitude of the output pressure in addition to the flow rate (that is, flow capacity) of air supplied to the pneumatic actuator 110. Actuator pressures may be fed back to the relay 225. Preamplifier 220, and relay 225 receive supply air at the pressure $p_{air}$, where $p_{air}$ may be regulated at, for example, 20–90 psig. Pneumatic pressure $p_{y1}$ from an output of the relay 225 is applied to the pneumatic actuator 110. Furthermore, when a double-acting pneumatic actuator 110 is used, pressure is required on both sides of the pneumatic actuator for it to operate, and therefore the pneumatic relay 225 has two outputs, $p_{y1}$ and $p_{y2}$ that feed the double-acting pneumatic actuator 110. For a single-acting pneumatic actuator 110, the return spring may supply the required return force.

Pressure sensors 230, 235, and 237 may be used in the valve positioner 120. Pressure sensors 230 and 237 monitor relay outputs $p_{y1}$ and $p_{y2}$, and pressure sensor 235 monitors a pressure $p_{air}$ of the air supply. Electrical outputs of the pressure sensors 230, 235 and 237 may be provided to the valve position controller 210 for monitoring neumatic actuator dynamics.

Valve positioner tuning is made difficult by the presence of Coulomb and stick-slip frictional forces. Movement of the valve stem 115 and valve flow modulating member 105 may be hindered by stick-slip and Coulomb friction. Coulomb friction results from two rigid bodies in contact with each other, and it depends on the force acting between the two bodies and with the material of each body. Stick-slip friction occurs when zero-velocity friction can exceed the friction at a finite relative velocity. The viscous frictional force opposes and is proportional to the relative motion between the two bodies and generally helps to stabilize the valve positioner system 100.

When the valve stem 115 is moving in a fixed direction, the valve member position y depends almost linearly on actuator pressure $p_y$. As such, locally-linear dynamic models may be identified for valve flow modulating member movement in a fixed direction. To identify a locally-linear dynamic model during pretuning, the actuator piston or diaphragm 110 is caused to move monotonically from one stuck position to another nearby stuck position. Presence of a viscous frictional force on the pneumatic actuator 110 can be useful for smoothing actuator dynamic behavior, particularly if it is not a spring return design.

Figure 3:
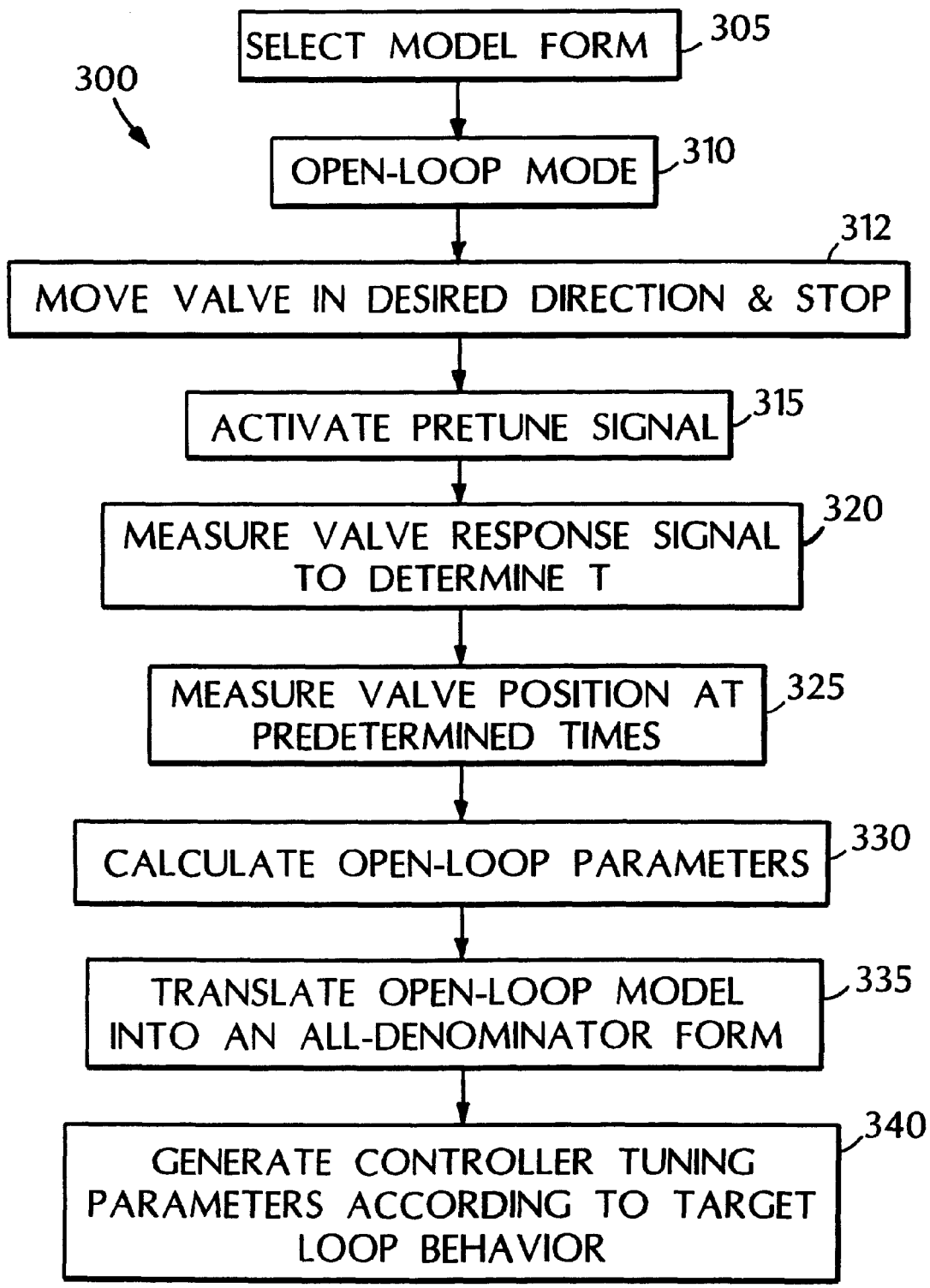
FIG. 3 is a flow chart of a pretuning procedure for a valve position controller used in the valve positioner.

FIG. 3 shows a flow chart of the pretuning procedure 300 in which the valve positioner 120 runs in open-loop mode to build a model of valve stem response. First, a model form is determined from the type of hardware used in the valve positioner 120 (step 305). For example, actuator construction may be double-acting, thus pressure signals to both sides of the pneumatic actuator 110 are needed for proper operation. Alternatively, the pneumatic actuator 110 may employ a return spring to provide controlled movement of the valve stem 115 in one direction. As another example, the preamplifier 220 and relay 225 may be self-regulating; that is, the actuator piston pressure is proportional to the i/p transducer 215 pressure. In contrast, the relay 225 may be non self-regulating; that is, the actuator piston pressure increases or decreases at a rate proportional to the difference between the i/p transducer pressure and a fixed reference.

A model is identified using an open-loop test (step 310). Additional models may be identified for each actuator piston motion direction at representative valve stem positions and supply pressures. First, the pneumatic actuator 110 is made to move in the desired direction and stop (step 312) so that the Coulomb friction force does not reverse when the next position change occurs. Then the pneumatic actuator 110 is caused to move in the same direction in response to a step, pulse, or doublet-pulse change, called a pretune signal, supplied by the valve position controller 210 while operating in its manual mode to manipulate the i/p transducer current (step 315). The choice of pretune signal depends on a number of integrators existing in the valve stem position response to valve position controller output u. When the valve stem position change exceeds a user-specified position-change threshold, the time T since the initial pretune signal change is recorded (step 320). Once T is determined, the valve stem position change is recorded at times T, 2T, and 3T (step 325). The pretune procedure 300 then identifies open-loop parameters that uniquely relate to the valve stem position and identify the open-loop model for the i/p transducer, relay, actuator, and valve flow modulating member (step 330). The open-loop transfer function model is translated into an all-denominator form by expanding into a denominator Taylor series in s=d()/dt (step 335). The pretune procedure 300 then generates valve position controller tuning parameters using an algebraic tuning procedure (step 340). The algebraic tuning procedure calculates valve position controller parameters directly from the identified process model to achieve a target behavior for the valve positioner system 100. The system tunes on demand by directly calculating new position controller parameters according to a function of the identified open-loop model and the preselected target closed-loop behavior. Algebraic tuning procedures are identified in U.S. Pat. No. 5,394,322, which is incorporated by reference.

Typically, the parameters identify a quadratic delay model for the valve flow modulating member 105, with the form of the model selected based on the type of valve positioner system 100. Specifically, a model form is selected from three choices: an integral-delay model, an integral-integral-delay model, and a gain-lag-delay model. Each model is detailed below.

Integral-Delay Model

This model may be identified for several valve positioner system types. In a first system, a single-acting pneumatic actuator 110 with a return spring uses a spool valve type relay 225. This first system has one open-loop integrator which corresponds to actuator charging since actuator pressure does not affect the position of the spool valve.

In a second system, a double-acting actuator piston 110 without spring return uses a pilot relay 225 which is regulated with actuator-pressure feedback. This second system has one open-loop integrator which calculates valve stem position from velocity. Viscous friction is needed to avoid a second open-loop integrator which calculates velocity from acceleration.

Figure 4:
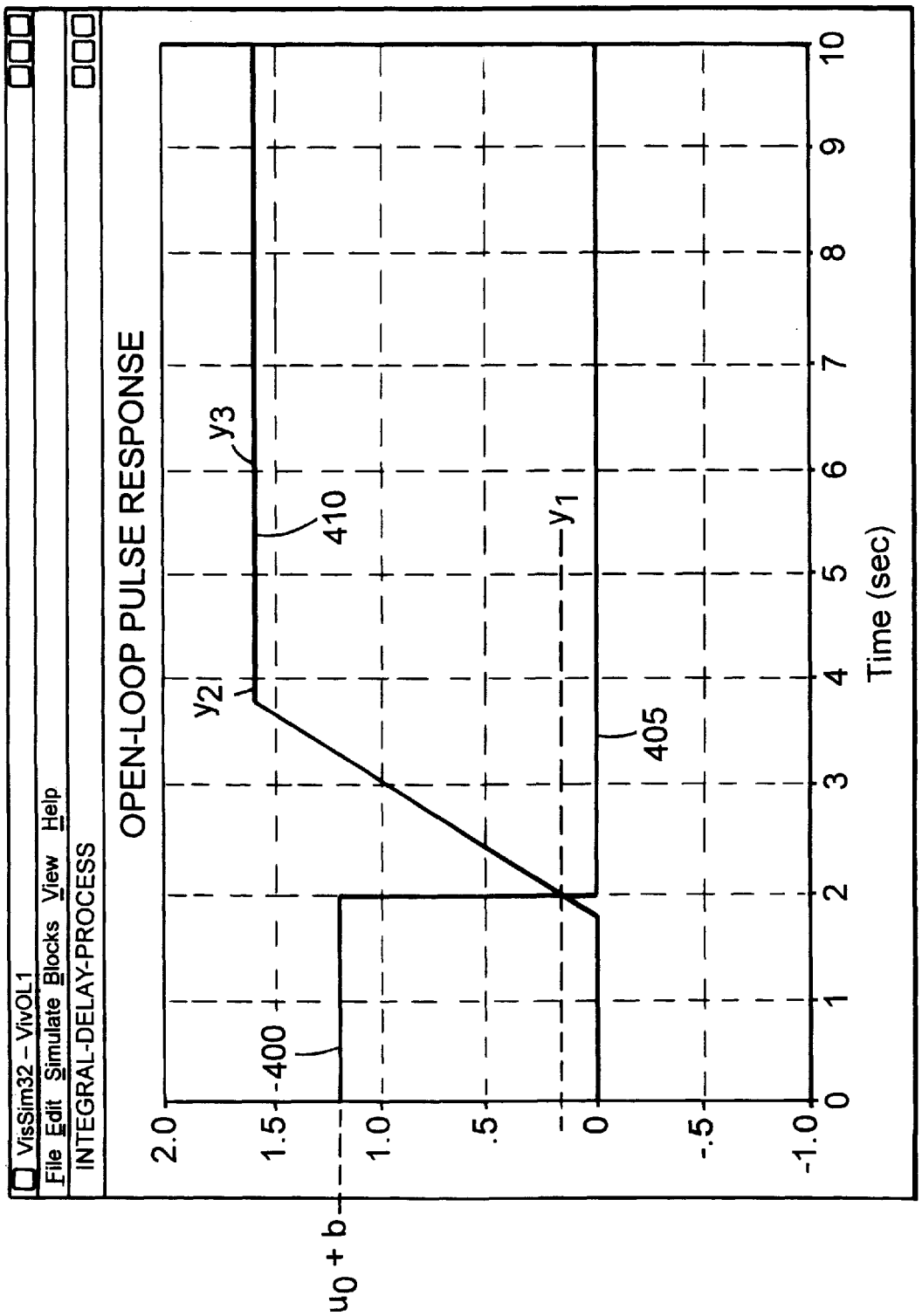
FIGS. 4–6 are graphs of open-loop response of the valve position controller.

Referring to FIG. 4, a current pulse 400 in the pretune signal 405 is used to move the valve stem 115 from one stuck position to another. While the valve stem 115 is unstuck, the open-loop response of the system, as shown by signal 410, is nearly linear. To produce the pulse, the pretune signal 405 is stepped from an initial value $u_0$ to $u_0+b$, where b is a user-specified current-change size. At time T, when the valve stem position has changed from its initial value by more than a user-specified position-change threshold, the value of the pretune signal 400 is returned to $u_0$ and T (a pulse width) is recorded. The pretune procedure then records position changes $y_1$, $y_2$, and $y_3$, corresponding to times T, 2T, and 3T, respectively. In FIG. 4, T equals 2 seconds.

The identification calculation is performed based on T, b, and position changes from the initial position $y_1$, $y_2$, and $y_3$. At time T, the position change $y_1$ is:

$$y_1 = \frac{b}{\tau_I}(T - \tau_d) \quad (1)$$

where $\tau_d$ is a delay time that reflects a delay in the valve position response, and $\tau_I$ is an integral time of the open-loop integrator. At times 2T and 3T, the valve stem position changes $y_2$ and $y_3$ are:

$$y_2 = y_3 = \frac{bT}{\tau_I} \quad (2)$$

Valve position response parameters, $\tau_d$ and $\tau_I$, then are calculated using equations 1 and 2 to identify the model. Solving the equations, the valve position response parameters are:

$$\tau_d = \left(1 - \frac{y_1}{y_2}\right)T \quad (3)$$

and $$\tau_I = \frac{bT}{y_2} \quad (4)$$

Integral-Integral-Delay Model

This model may be identified for a double-acting pneumatic actuator 110 with no return spring and piloted with a spool valve type relay 225. This model has two open-loop integrators: a first open-loop integrator corresponds to actuator piston charging because actuator piston pressure does not affect the spool position and a second open-loop integrator calculates actuator piston position from velocity.

Figure 5:
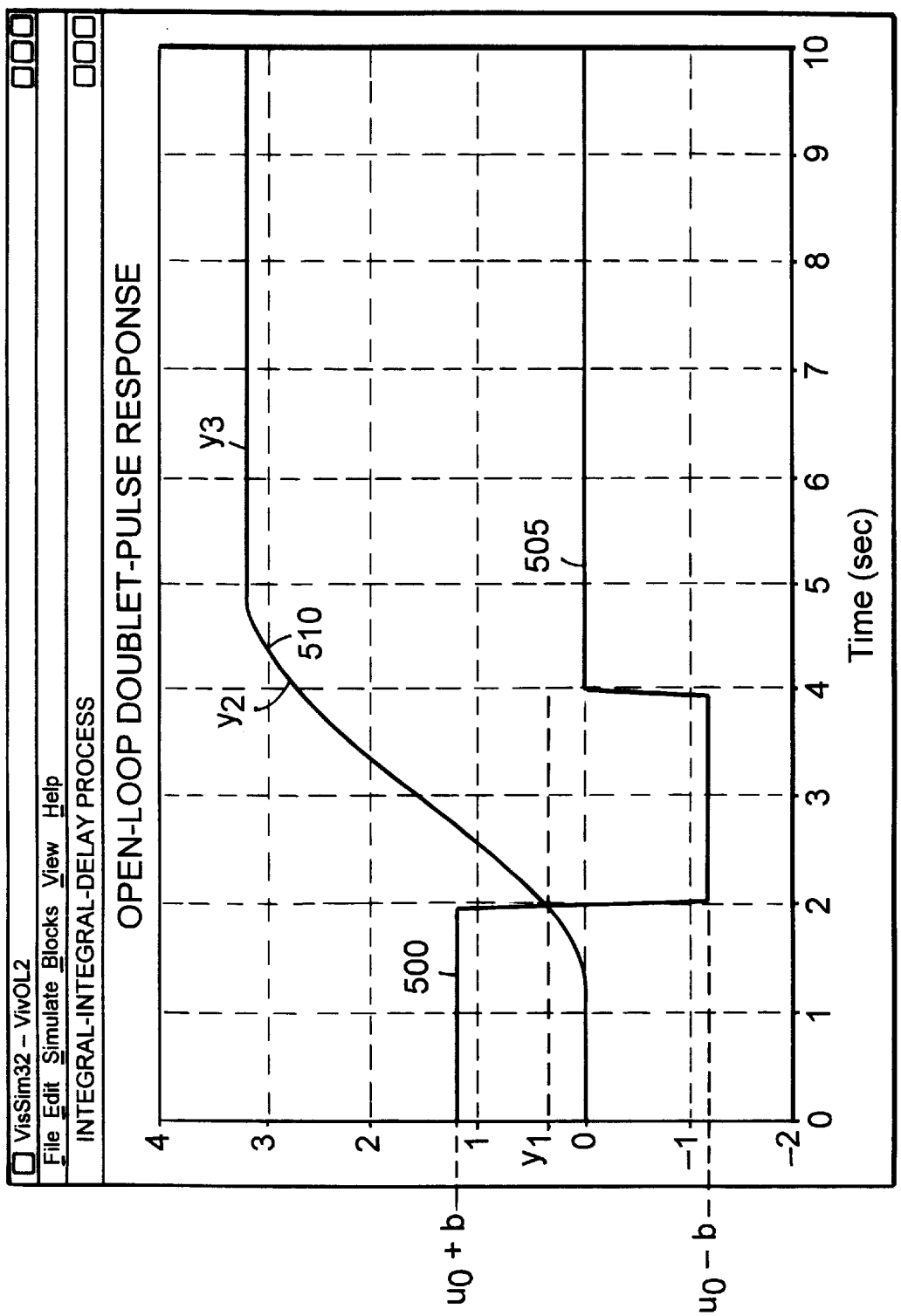

Referring to FIG. 5, a valve position controller output doublet pulse 500 in the pretune signal 505 is used to move the valve stem 115 from one stuck position to another. The open-loop response, as shown by signal 510, has a quadratic response. The pretune signal 505 is stepped from an initial value $u_0$ to $u_0+b$, where b is the user-specified pretune signal change size. At time T when the valve stem position changes from its initial value by more than the user-specified position change threshold, the value of pretune signal 500 is changed to $u_0-b$ and T is stored.

The value of the pretune signal is returned to $u_0$ at time 2T. The pretune procedure records position changes $y_1$, $y_2$, and $y_3$ corresponding to times T, 2T, and 3T, respectively. In FIG. 5, T equals 2 seconds.

The identification calculation is performed based on T, b, and position changes $y_1$, $y_2$, and $y_3$. At time T (2 sec.), the position change $y_1$ is:

$$y_1 = \frac{b}{2}\left(\frac{T - \tau_d}{\tau_I}\right)^2 \quad (5)$$

where $\tau_d$ and $\tau_I$ are delay and integral times, as described above. At time 2T (4 sec.), the valve stem position change $y_2$ is:

$$y_2 = \frac{b}{2}\left(\frac{2T^2 - \tau_d^2}{\tau_I^2}\right) \quad (6)$$

The final stuck valve stem position change $y_3$ is:

$$y_3 = b\left(\frac{T}{\tau_I}\right)^2 \quad (7)$$

Eqns. 5 and 6 may be solved for the two unknowns $\tau_d$ and $\tau_I$. The valve positioner parameters are:

$$\tau_d = T \left( \frac{1 - \sqrt{\frac{y_1}{y_2}\left(1 + \frac{2y_1}{y_2}\right)}}{1 + \frac{y_1}{y_2}} \right) \quad (8)$$

and $$\tau_I = \sqrt{(2T^2 - \tau_d^2)\frac{b}{2y_2}} \quad (9)$$

For a positive delay, $$2\frac{y_1}{y_2} < 1. \quad (10)$$

Gain-Lag-Delay Model

Figure 6:
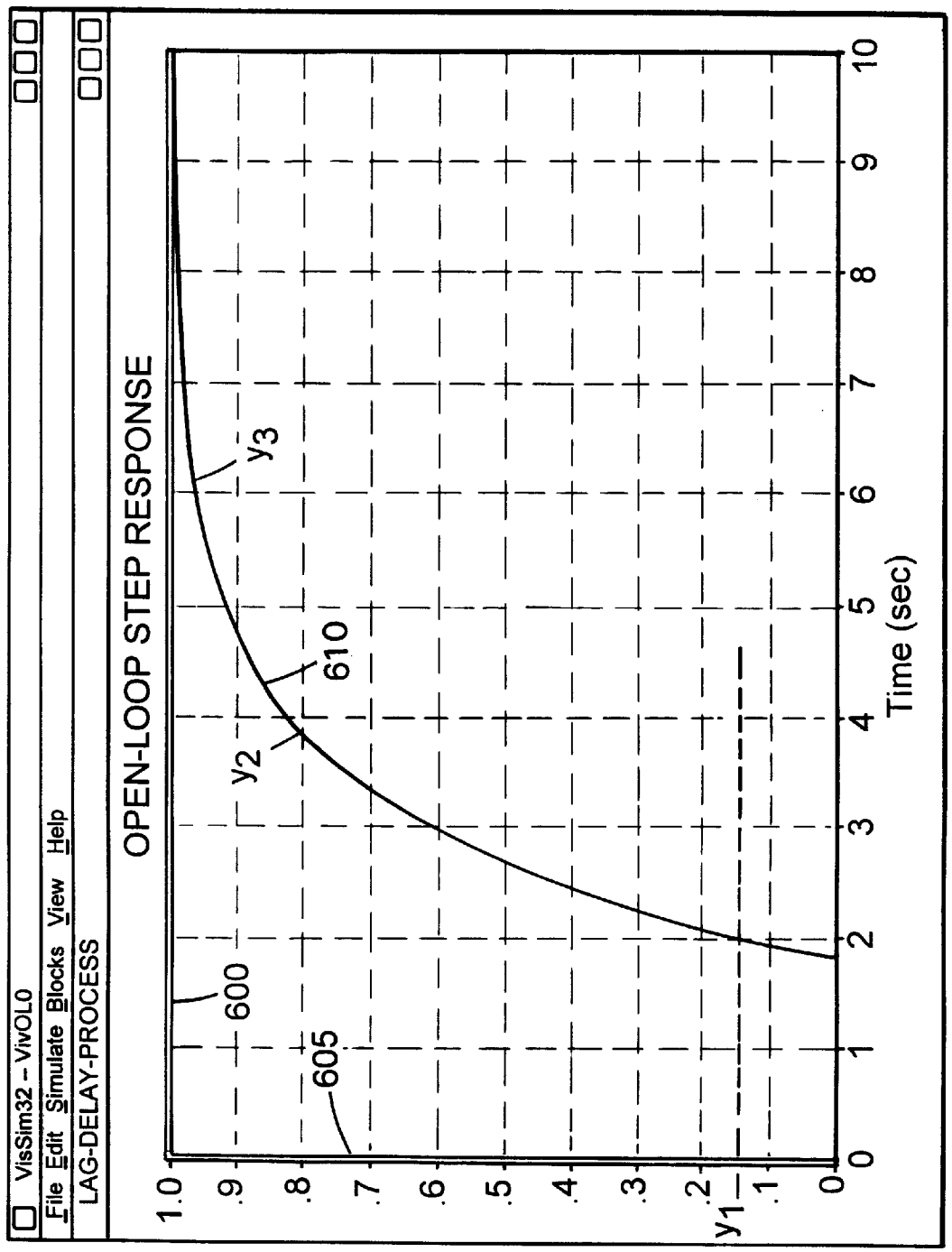

This model may be identified for a single-acting pneumatic actuator 110 with a return spring and a self-regulating relay 225 with actuator piston pressure feedback. This model has zero open-loop integrators. Referring to FIG. 6, a step 600 in the pretune signal 605 is used to move the valve stem 115 from one stuck position to another. Open-loop response signal 610 has an exponential form. The pretune signal 605 is stepped from an initial value $u_0$ to $u_0+b$, where b is the user-specified pretune signal change size. At time T, when the valve stem position changes from its initial value by more than a user-specified position-change threshold, T is stored. The pretune procedure then records position changes $y_1$, $y_2$, and $y_3$ taken at times T, 2T, and 3T, respectively. In FIG. 6, T equals 2 seconds.

The identification calculation is performed based on T, b, and position changes $y_1$, $y_2$, and $y_3$. At time T (2 sec.), the position change $y_1$ is:

$$y_1 = b \cdot g \left(1 - e^{-\left(\frac{T-\tau_d}{\tau_L}\right)}\right) \quad (11)$$

where g is a gain. The term b·g is a steady-state magnitude of the valve stem position response, $\tau_L$ is a lag time constant that reflects a rate at which the valve positioner responds to changes in input, and $\tau_d$ is defined above. At time 2T (4 sec.), the position change $y_2$ is:

$$y_2 = b \cdot g \left(1 - e^{-\left(\frac{T-\tau_d}{\tau_L}\right)} e^{-\frac{T}{\tau_L}}\right) \quad (12)$$

At time 3T (6 sec.), $y_3$ is:

$$y_3 = b \cdot g \left(1 - e^{-\left(\frac{T-\tau_d}{\tau_L}\right)} e^{-\frac{2T}{\tau_L}}\right) \quad (13)$$

The equations are solved simultaneously to determine the three unknowns g, $\tau_d$, and $\tau_L$, using the constraint that g must be positive.

The response parameters are:

$$g = \frac{1}{b}\left(\frac{y_2^2 - y_1 y_3}{2y_2 - y_1 - y_3}\right) \quad (14)$$

$$\tau_L = \frac{T}{\ln\left(\frac{b \cdot g - y_1}{b \cdot g - y_2}\right)} \quad (15)$$

$$\tau_d = T + \tau_L \ln\left(1 - \frac{y_1}{b \cdot g}\right) \quad (16)$$

A special case occurs when $2y_2 \leq y_1+y_3$. In this case, $\tau_L$ and g are assumed infinite and $y_3$ is ignored. However, the ratio $$\frac{\tau_L}{g} = \frac{b \cdot T}{y_2 - y_1} \quad (17)$$

and $$\tau_d = T\left(\frac{1 - y_1}{y_2 - y_1}\right) \quad (18)$$

remain finite in this special case. Another special case occurs when $y_2 \geq y_3$. In this case $\tau_L$ is assumed to be zero and $y_3$ is ignored. Equations 14–16 are rewritten as $$\tau_L = 0,$$

$$g = \frac{y_2}{b},$$

and $$\tau_d = T.$$

Algebraic Tuning

Algebraic tuning uses an all denominator form for the model:

$$(a_0 + a_1 s + a_2 s^2 + a_3 s^3 + \ldots)y = u \quad (19)$$

where y is the controlled valve stem position, u is the output of the valve position controller 210 being fed to the i/p transducer 215, and s is an algebraic operator representing differentiation, s=d()/dt. Using a Taylor-series expansion for an inverse delay $$e^{\tau_d s} = \sum_{m=0}^{\infty} \frac{1}{m!}(\tau_d s)^m \quad (20)$$

coefficients for the model may be determined. Coefficients for the integral-delay model are given as:

$$a_0 = 0 \quad (21)$$

$$a_1 = \tau_I$$

$$a_2 = \tau_I \cdot \tau_d$$

$$a_3 = \frac{\tau_I \cdot \tau_d^2}{2}$$

$$a_4 = \frac{\tau_I \cdot \tau_d^2}{6}$$

In general, higher-order coefficients may be ignored. Coefficients for the integral-integral-delay model are given as:

$$a_1 = a_0 = 0 \quad (22)$$

$$a_2 = \tau_I^2$$

$$a_3 = \tau_I^2 \cdot \tau_d$$

$$a_4 = \tau_I^2 \cdot \frac{\tau_d^2}{2}$$

For the gain-lag-delay model, coefficients are given as:

$$a_0 = \frac{1}{g} \quad (23)$$

$$a_1 = \frac{1}{g}(\tau_L + \tau_d)$$

$$a_2 = \frac{\tau_d}{g}\left(\tau_L + \frac{\tau_d}{2}\right)$$

$$a_3 = \frac{\tau_d^2}{2g}\left(\tau_L + \frac{\tau_d}{3}\right)$$

Figure 7:
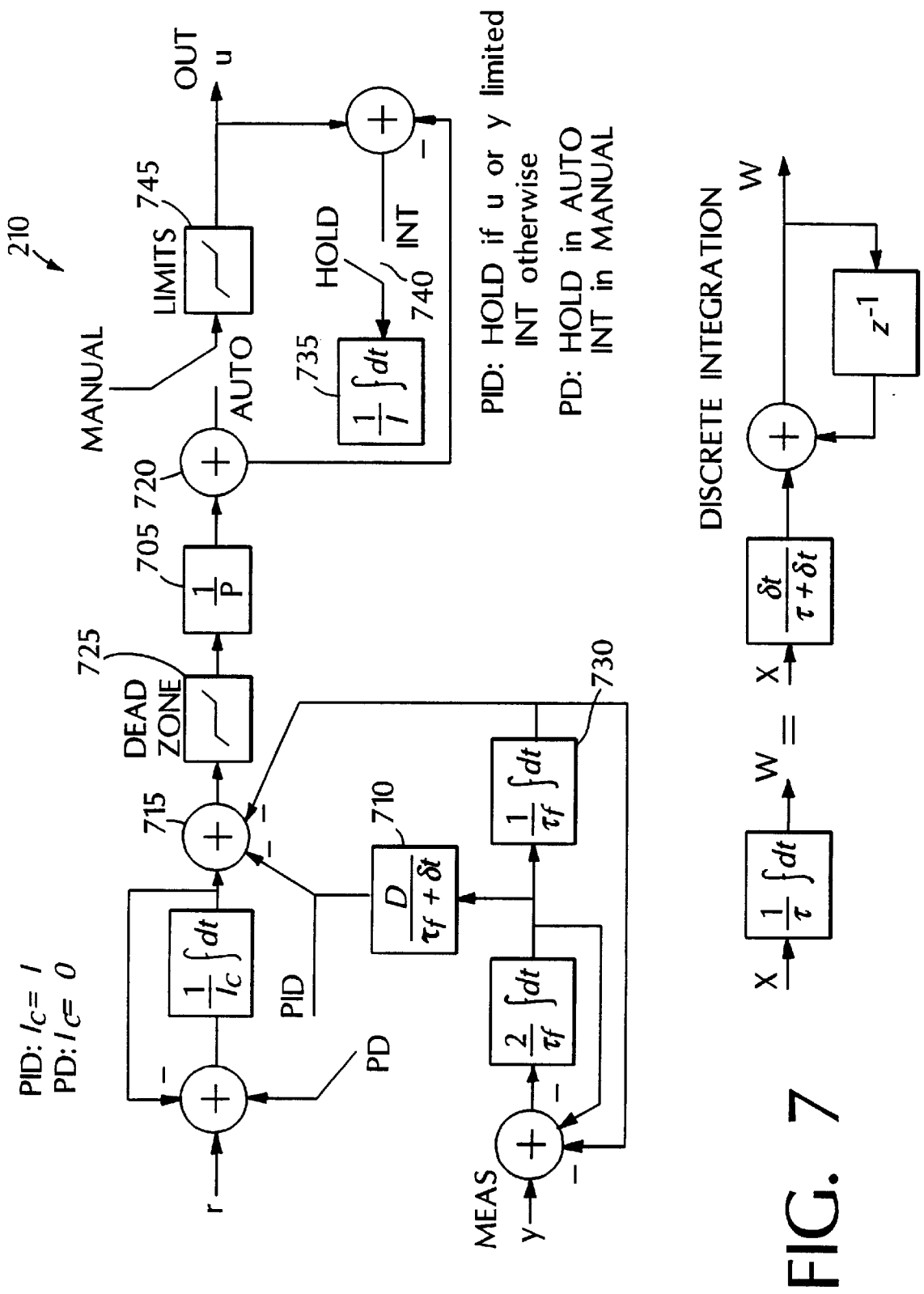
FIG. 7 is a block diagram showing structure of the valve position controller.

Referring to FIG. 7, a PD controller may be used with a valve positioner and valve which includes at least one open-loop integrator. If the valve positioner contains an open-loop integrator, it is not necessary to have integral action in the valve position controller, unless an upset in supply pressure would require an offset change in i/p current to restore a steady-state valve stem position. The PD controller, which is implemented by the valve position controller 210, may be viewed as being connected to the i/p transducer 215, and as receiving a position y of the valve stem 115. The PD controller has a proportional term 705 that receives an error, r-y, and has a derivative term 710 that receives the filtered measured position y. The outputs are summed at a junction 715, multiplied by the inverse proportional band P 705, and added at junction 720 with a bias stored in the integrator 705 to produce a control output u.

An algebraic tuner generates the controller parameters $K_s$, $K_m$, and $D_m$. Combining the model form of Eqn. 19 and the PD controller form written below:

$$u = K_s r - (K_m + D_m s) y \quad (24)$$

to eliminate u gives the closed-loop equation:

$$[a_0 + K_m + (a_1 + D_M)s + a_2 s^2 + a_3 s^3 \ldots] y = K_s r \quad (25)$$

A target behavior for the valve position controller is chosen to achieve desirable closed-loop behavior. The PD controller should be tuned for fast non-overshooting response to a set point step. A cascade of n equal lags has this behavior and is represented by:

$$\left(1 + \frac{\tau_{CL} s}{n}\right)^n y = \left[1 + \tau_{CL} s + \left(\frac{n-1}{2n}\right)(\tau_{CL} s)^2 + \left(\frac{n-2}{3n}\right)\left(\frac{n-1}{2n}\right)(\tau_{CL} s)^3 \ldots\right] y = r \quad (26)$$

where $\tau_{CL}$ is a closed-loop time constant that reflects a rate at which the valve stem position changes in response to a set point change.

Equating corresponding coefficients (to fourth order in s) from the closed-loop model in Eqn. 25 and the target behavior in Eqn. 26 gives:

$$a_0 + K_m = K_s \quad (27)$$

$$a_1 + D_m = K_s \tau_{CL}$$

$$a_2 = K_s \tau_{CL}^2 \left(\frac{n-1}{2n}\right) = a_1 \tau_{CL} \left(\frac{n-1}{2n}\right)$$

$$a_3 = K_s \tau_{CL}^3 \left(\frac{n-1}{2n}\right)\left(\frac{n-2}{3n}\right) = a_2 \tau_{CL} \left(\frac{n-2}{3n}\right)$$

$$a_4 = a_3 \tau_{CL} \left(\frac{n-3}{4n}\right)$$

The first four equations can be solved for the four unknowns $K_s$, $K_m$, $D_m$, and $\tau_{CL}$ when n is specified:

$$\tau_{CL} = \frac{3n}{n-2} \frac{a_3}{a_2} \quad (28)$$

$$K_s = \frac{2n}{n-1} \frac{a_3}{\tau_{CL}^2}$$

$$D_m = K_s \tau_{CL} - a_1$$

$$K_m = K_s - a_0$$

The number of target lags n may be used as a tuning constant, and may be chosen to be as large as possible without causing overshoot. Preferably, the parameter n is calculated from the fourth and fifth equations in Eqn. 27:

$$n = \frac{9a_3^2 - 8a_2 a_4}{3a_3^2 - 4a_2 a_4} \quad (29)$$

For an integral-delay process, where $3a_2 a_4 = 2a_3^2$, n=11. However, if $D_m$ is set to zero, the third and fourth equations of Eqn. 27 give n=5 since $2a_1 a_3 = a_2^2$ and:

$$n = \frac{4a_2^2 - 3a_1 a_3}{2a_2^2 - 3a_1 a_3} \quad (30)$$

$$K_s = \frac{a_1}{\tau_{CL}}, K_m = K_s - a_0$$

Figure 8:
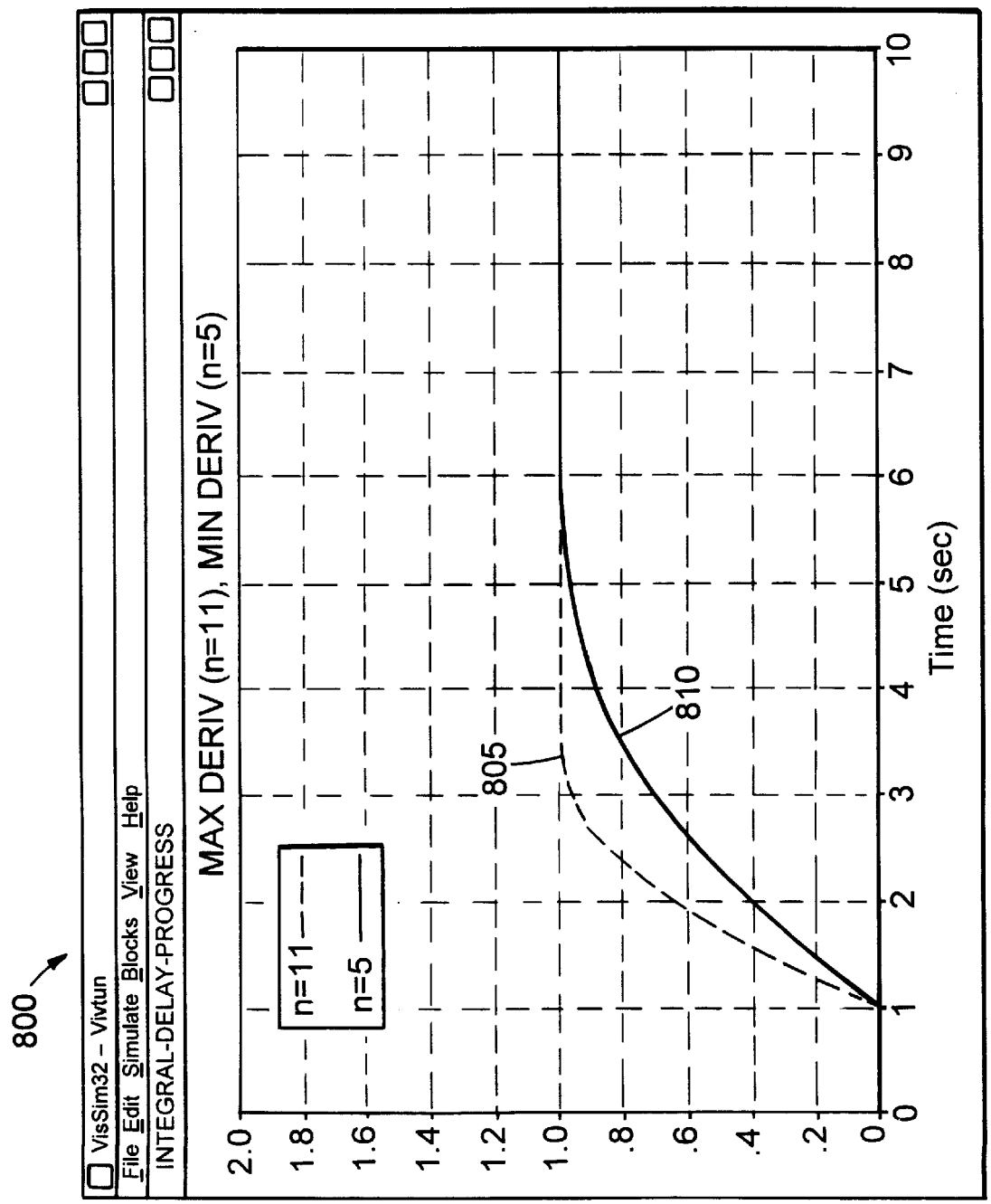
FIG. 8 is a graph of closed-loop response of the valve positioner.

FIG. 8 shows a graph 800 of closed-loop responses for n=5 805 and n=11 810 for an integral-delay process.

For an integral-integral-delay process, using Eqn. 29 gives n=5 since $2a_2 a_4 = a_3^2$.

For a process with $a_0 \neq 0$, that is, a gain-lag-delay process, a controller must be used with integral action to eliminate steady-state offset. Referring to FIG. 7, a PID controller is used in a valve positioner 120 that contains no open-loop integrators. The PID algebraic tuning calculation is done in two steps. First, an inner-loop PD controller with infinite n is tuned using the above first four equations to give $\tau_{CL} = 3a_3/a_2$. Unless there is a significant secondary lag, derivative action may be omitted ($D_m = 0$). Since this eliminates an unknown, the fourth equation in Eqn. 27 may also be discarded and Eqn. 27 can be solved giving $\tau_{CL} = 2a_2/a_1$.

Next, an outer-loop integral controller is tuned to cope with the closed inner-loop unity-gain delay process using an integral term $I_o = 2.5 \tau_{CL}$. This causes the closed outer loop to behave like a 5 equal-lag process.

Additionally, the outer-loop controller may apply proportional action $K_o$ to the y measurement. The result behavior, like an 11 equal lag process, is identical to applying derivative action in the PD controller of an integral-delay process. The form of the outer-loop integral controller is given as:

$$r_I = u_o = \frac{1}{I_o s} r - \left(\frac{1}{I_o s} + K_o\right) y \quad (31)$$

For n=11, $K_o$=0.2 and $I_o$=1.53$\tau_{CL}$. Combining the outer-loop controller in Eqn. 30 with the inner-loop controller in Eqn. 24 gives:

$$u = \frac{K_s}{I_o s} r - \left(\frac{K_s}{I_o s} + K_s K_o + K_m + D_m s\right) y \quad (32)$$

Eqn. 32 may be parameterized into a more conventional form, FIG. 7, using $$\frac{1}{P} = K_s K_o + K_m, \quad I = \frac{I_o}{K_s P},$$

and $$D = D_m P$$

to give:

$$u = \frac{1}{P}\left[\frac{1}{Is} r - \left(\frac{1}{Is} + 1 + Ds\right) y\right] \quad (33)$$

The advantage of algebraic tuning is that it allows both tuning constants (P, I, and D) and closed-loop performance measures (mean delay time $\tau_{CL}$ and a measure of rise time n) to be calculated directly from a polynomial model (including terms up to third order in s) of the open-loop process.

Gain and derivative actions are not applied to the set point in the PID controller and derivative action is not applied to the set point in the PD controller. FIG. 7 shows both the PID (Eqn. 33) and the PD (Eqn. 24 with $K_s$=$K_m$=1/P and $I_0$=∞) controller structures. A small dead zone 725 may be introduced upstream of the controller's integration to avoid limit cycling caused by the valve member sticking in a slightly incorrect position. Furthermore, integration downstream of the small dead zone 725 is desirable if valve or relay overlap or magnetic hysteresis in the i/p transducer occurs. Integration allows the actuator piston 110 to stick in a slightly incorrect position without triggering a limit cycle.

The measurement y is filtered with a second-order Butterworth low-pass filter 730 which serves also to supply the filtered measurement's derivative 710. The filter time constant ($\tau_f \geq 0$) should be set to approximately:

$$\tau_f = \frac{\tau_d}{40} - \delta t \quad (34)$$

where $\delta t$ is a sampling interval. The filter 730 prevents excessive valve stem activity at frequencies beyond the closed-loop bandwidth. The sampling interval $\delta t$ should be less than the filter time $\tau_f$ to prevent a diminished effectiveness of the derivative term 710. The filter time constant is added to the identified delay time $\tau_d$ prior to the algebraic tuning calculation. Output of the integrator applied to set point and output of the derivative and Butterworth filters 730, 710 applied to the measured y connect at junction 715. The output of junction 715 is supplied to the proportional action 705 and output of an integrator 735 and proportional action 705 connect at junction 720.

Integrator windup is avoided by freezing (i.e., holding) 740 the integral action 735 when output u reaches a limit 745. Valve stem travel limits should be placed inside physical stops such that the set point r may have a value outside the valve stem limit in order that the valve stem reach a physical stop in steady state. To avoid upstream windup, a status word indicating high or low limiting, together with the measured valve stem position y, should be sent back to the process controller 125 which outputs the valve position controller set point.

Other embodiments are within the scope of the following claims.

What is claimed is:

1. A valve position controller tuning method that accounts for friction in valve motion by building a dynamic model of position response of a valve stem attached to a valve flow modulating member and controlled by a valve positioner, the method comprising:
   selecting a model form;
   operating the valve position controller in an open-loop mode;
   activating a valve position controller output signal that causes the valve stem to move monotonically from one stuck position to another stuck position immediately after a motion in that same direction;
   measuring a first valve stem position change and a corresponding valve stem position change time when a valve stem position exceeds a position threshold;
   measuring valve stem position changes at times that depend on the first measured valve stem position change time; and
   using the measured results, calculating valve position response parameters for the selected model form.

2. The method of claim 1, further comprising building an all-denominator transfer function model for the selected model form.

3. The method of claim 1, further comprising operating the valve position controller in a closed-loop mode that processes the set point signal of valve stem position in conjunction with the valve position feedback signal.

4. The method of claim 2, wherein building an all-denominator transfer function model for the selected model form comprises expanding the selected model form into a denominator Taylor series that is a function of an algebraic operator representing differentiation.

5. The method of claim 1, wherein the times that depend on the first measured valve stem position change time correspond to integer multiples of the first measured valve stem position change time.

6. The method of claim 1, wherein selecting the model form is based on a type of valve actuator system used.

7. The method of claim 1, wherein activating the valve position controller output signal comprises moving a valve stem of the valve flow modulating member in either of two possible movement directions.

8. The method of claim 1, wherein activating the valve position controller output signal comprises changing a current value of an input signal fed to a current-to-pressure (i/p) transducer that converts the input signal into a pneumatic signal proportional to the input signal.

9. The method of claim 8, wherein changing the current value of the input signal comprises using a step function.

10. The method of claim 8, wherein changing the current value of the input signal comprises using a pulse function.

11. The method of claim 8, wherein changing the current value of the input signal comprises using a doublet-pulse function.

12. The method of claim 8, wherein activating the valve position controller output signal is based on a number of integrators characterizing the response of valve stem position to the i/p transducer input signal.

13. The method of claim 8, wherein the valve position controller comprises a proportional derivative controller that receives valve stem position information and a set point for valve stem position to determine a new i/p input signal.

14. The method of claim 8, wherein the valve position controller comprises a proportional integral derivative controller that receives valve stem position information and a set point valve stem position to determine a new i/p input signal.

15. The method of claim 1, wherein the selected model form comprises an integral-delay model.

16. The method of claim 1, wherein the selected model form comprises an integral-integral-delay model.

17. The method of claim 1, wherein the selected model form comprises a gain-lag-delay model.

* * * * *